(12) United States Patent
Bloecker et al.

(10) Patent No.: US 6,499,212 B2
(45) Date of Patent: Dec. 31, 2002

(54) DEVICE AND PROCESS FOR JOINING FITTING PARTS ON HOLLOW PROFILES BY MEANS OF FLUID HIGH INTERNAL PRESSURE

(75) Inventors: Henning Bloecker, Stelle (DE); Martin Kruessmann, Stuttgart (DE); Jochen Paus, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/725,909

(22) Filed: Nov. 30, 2000

(65) Prior Publication Data

US 2001/0004804 A1 Jun. 28, 2001

(30) Foreign Application Priority Data

Nov. 30, 1999 (DE) .......................................... 199 57 508

(51) Int. Cl.⁷ ................................................. B23P 21/00
(52) U.S. Cl. ......................... 29/771; 29/421.1; 29/516; 269/48.1; 269/48.2
(58) Field of Search .......................... 29/771, 516, 517, 29/421.1; 269/22, 48.1, 48.2

(56) References Cited

U.S. PATENT DOCUMENTS

| 4,951,492 A | * | 8/1990 | Vogt ............................... 72/61 |
| 5,054,756 A |   | 10/1991 | Riemscheid et al. ........ 269/48.1 |
| 5,388,814 A | * | 2/1995 | Riemscheid et al. ........ 269/48.1 |

FOREIGN PATENT DOCUMENTS

| DE | 37 16 986 | 12/1988 | |
| GB | 2206515 | * 1/1989 | ........... B21D/39/20 |
| GB | 2207071 | * 1/1989 | ........... B21D/39/20 |

* cited by examiner

Primary Examiner—David P. Bryant
Assistant Examiner—Essama Omgba
(74) Attorney, Agent, or Firm—Crowell & Moring LLP

(57) ABSTRACT

A device and method for joining fitting parts provided with a passage opening on hollow profiles through partial expansion of the hollow profiles at the location of the fitting parts is provided. The fitting parts are slid on with the passage openings and are held in position by-means of fluid high internal pressure expansion of the hollow profile. The device includes an expanding lance, which can be slid into the hollow profile and exhibits an axial borehole for the purpose of guiding the pressure fluid. The axial borehole is connected to a fluid high pressure generating system and exhibits a cross channel with an outlet for the pressure fluid in the direction of the hollow profile location to be expanded. The shell surface of the expanding lance exhibits sealing elements that are spaced apart and that define the outlet so as to seal axially on both sides against high pressure. To a reliable joining of the fitting parts on hollow profiles even when the hollow profiles exhibit small outer diameters, it is proposed that the expanding lance comprises two separate, aligned oblong components, of which at least one bears the axial borehole which empties freely on an end face near the outlet. The facing ends of the lance components form the cross channel for the axial borehole of the expanding lance. Furthermore, the device includes a drive unit operable to drive the two lance components into respective hollow profile ends, and are supported on an end side during the expansion phase.

17 Claims, 1 Drawing Sheet

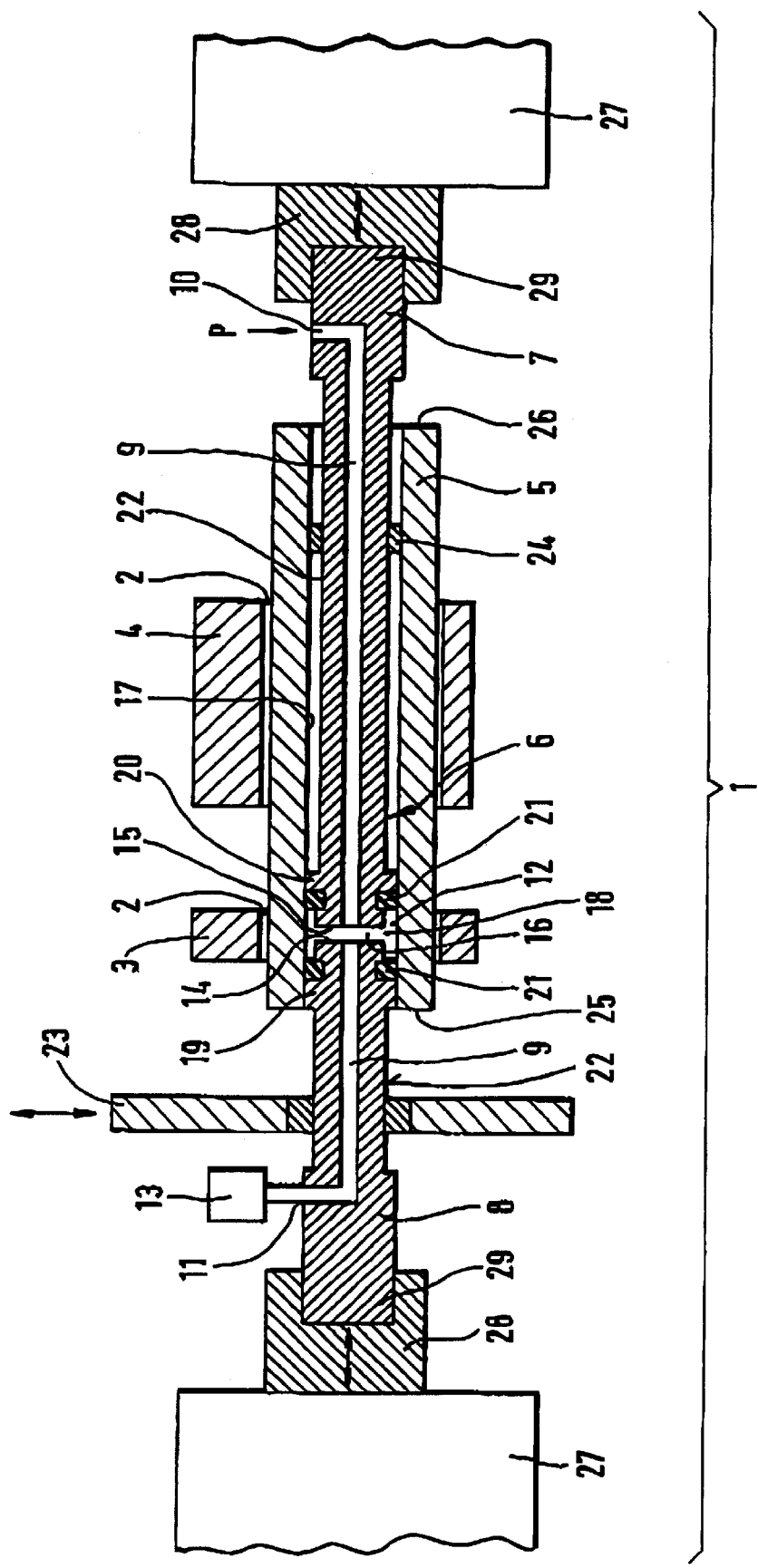

DEVICE AND PROCESS FOR JOINING FITTING PARTS ON HOLLOW PROFILES BY MEANS OF FLUID HIGH INTERNAL PRESSURE

BACKGROUND OF THE INVENTION

This application claims the priority of German Patent Document 199 57 508.8, filed in Germany, Nov. 30, 1999, the disclosure of which is expressly incorporated by reference herein.

The invention relates to a device and process for joining fitting parts on hollow profiles fluid high internal pressure.

A device of this general type is known from German Patent Document 37 16 986 A1 (corresponding to U.S. Pat. No. 5,054,756). The hollow profile is expanded plastically at the joining location by means of fluid high internal pressure. The more solid fitting part is expanded simultaneously within the elastic limits. Following high pressure release, the fitting part springs back at the internal diameter of its passage opening, whereas the hollow profile remains in its plasticized state. These physical features make it possible to achieve a very high, virtually undetachable press-fit joint between the fitting part and the hollow profile. In operation, i.e., at an existing high internal pressure, the expanding lance, which is used for this purpose and described there, is highly subjected to extreme tensile stress so that constructive measures, such as for example an increase in the ratio of the lance diameter to the diameter of the axial borehole, which runs in the expanding lance and guides the pressure fluid, must be taken in order to prevent the expanding lance from tearing and to guarantee in this manner a reliable process for joining the fitting parts on the hollow profiles. Nevertheless, the lance is subject to relatively high wear due to the high tensile stress or the mechanical stress alternating between stress and relief in the course of the operating life of the expanding lance. For this reason after a specific period of use it is necessary to repair the lance or make an expensive replacement with an identical new lance. Furthermore, hollow profiles with a small outer diameter, i.e., less than 16 mm, cannot be reliably joined by the customary method, since in the course of the process the use of correspondingly thin (less than 10 mm outer diameter) expanding lances results in the lance snapping after just a few expansion operations (called "shots" in the technical jargon due to their speed). This state in turn results inevitably in a production standstill and a rejected part.

An object of the invention is to improve a device of this class to the effect that the joining of fitting parts on hollow profiles by means of partial high internal pressure deformation is also possible and reliable with an expanding lance even when the hollow profiles exhibit small outer diameters.

This object is achieved by the invention by providing a device for joining fitting parts, provided with a device for joining fitting parts, provided with a passage opening, on a hollow profile through partial expansion of the hollow profile at a location of the fitting parts, slid on with the passage opening, by means of fluid high internal pressure, said device comprising an expanding lance, which can be slid into the hollow profile and exhibits an axial borehole for the purpose of guiding the pressure fluid, said axial borehole being connected, first of all, to a fluid high pressure generating system and secondly exhibiting a cross channel with an outlet for the pressure fluid in a direction of the hollow profile location to be expanded, whereby the shell surface of the expanding lance exhibits sealing elements that are spaced apart and that define an outlet so as to seal axially on both sides against high pressure, wherein the expanding lance comprises two separate, aligned components, of which at least one bears the axial borehole, which axial borehole empties freely on an end face near an outlet of said at least one component, end faces of the oblong components that face each other forming a cross channel for the axial borehole of the expanding lance, and wherein the device includes a drive unit, operable to drive the two components into the hollow profile end, facing the respective component, and are supported on the end side during the expansion phase.

Thanks to the invention, tensile stress of the expanding lance is avoided. The two components of the lance are subjected only to pressure so that the lance is prevented from tearing. Since the stability of the lance with respect to an adequately strong "wall thickness" is no longer important due to the solution of the invention, the outer diameter of the expanding lance and the axial borehole can be dimensioned very small and, nevertheless, work reliably. In this manner fitting parts can also be joined in the desired manner on hollow profiles with small outer diameter by means of partial high internal pressure deformation with the pressure fluid-guiding expanding lance.

With the device of the invention, joining is done preferably sequentially. This means that each individual joint along the hollow profile is approached in succession by displacing the expanding lance inside the hollow profile. For few fitting parts this type of joining does exhibit negligibly higher timing than the joining of parts in a shot. Furthermore, it has been demonstrated to be advantageous for the process if owing to the small volume of fluid, required for sequential joining, the time for building up the high fluid pressure is also very short. Furthermore, the assembly of the expanding lance is significantly simplified over the conventional one.

Hence, it is not necessary to have a leakage borehole for draining the fluid volume from the hollow profile in the direction of the outside. Said volume of fluid creeps past the sealing arrangement, sealing both sides of the expansion point in the axial direction, and into the pressure-free, adjoining annular slit. Or when the previous seal fails, there is the risk of an expansion between the fitting parts, since in the case of a leak, the pressure fluid—when the seal carrier for passage of an adequately large quantity of fluid volume has been suitably designed—can flow out unimpeded.

In addition, objects achieved in this respect by means of the invention are that the design of the high pressure unit can be simpler, since it is no longer necessary that it automatically recognize a drop in pressure. In addition, there is no need for spacer sleeves and positioning stops. Furthermore, it is significantly simpler to compensate for the manufacturing-induced concentricity error at the internal diameter of the hollow profile with the design of the expanding lance, since only the single expansion area of the expanding lance must be designed in accordance with the error tolerance. This feature contributes to the simplified design of the expanding lance and to the use of less precisely machined and, therefore, less expensive hollow profiles.

Another important advantage of the expanding lance having two parts is that the two components can be spaced axially apart at variable distances so that with only one sealing arrangement at the hollow profile, expansions of varying length can be formed. Furthermore, there is the possibility of tailoring individually the fluid pressure height to the diverse expansion points and their desired final shape.

It is also contemplated by the invention to provide one or both components of the lance with other cross boreholes so that several points on the hollow profile can be expanded—as usual—simultaneously in one shot. In so doing, the customary lance head can be dispensed with. However, the aforementioned advantages of sequential joining also drop away.

Advantageous designs of the invention are disclosed below and in the claims.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a sectional view of a device for joining fitting parts, constructed according to a preferred embodiment of the present invention.

DETAILED DESCRIPTION OF THE DRAWINGS

The single drawing FIGURE depicts a device 1 for joining fitting parts, for example cams 3 and 4, provided with a passage opening 2, on hollow profiles, for example a hollow shaft 5, in order to form a camshaft. Said device works with fluid high internal pressure and brings about through partial expansion of the hollow shaft 5 at the location of the cams 3 and 4, which are slid on with the passage opening 2, the joining that ends in a very strong press-fit joint.

The device 1 includes an expanding lance 6, which is slid into the hollow shaft 5 and comprises two separate, aligned oblong components 7 and 8. In both components 7, 8 there runs centrally an axial borehole 9, in which the pressure fluid is guided and which exhibits an inlet 10 at the longer component 7. The inlet 10 is connected to a fluid high pressure generating system and is located outside the hollow shaft 5, to be joined when both components 7, 8 are slid into the hollow shaft 5. Furthermore, the axial borehole 9 exhibits in the outward direction on the shorter hollow shaft 8 an outlet 11, which is also located outside the hollow shaft 5 to be joined when both components 7, 8 are in the slide-in position in the hollow shaft 5. The described arrangement of the inlet 10 and the outlet 11 makes it possible to fill quickly and without air bubbles the expanding lance 6 and the annular expansion space 12 with pressure fluid at the point on the hollow shaft 5 to be expanded. The outlet 11 exhibits a check valve 13, which is closed during expansion in order to build up pressure and is opened following expansion for fast pressure relief.

As an alternative, the axial borehole 9 can also run only in the component 7. In this case, it must also exhibit, in addition to the inlet 10, the outlet 11. In this respect the component 8 does not exhibit any borehole and is, therefore, simpler to produce. It is also conceivable according to the invention that both components 7 and 8 exhibit one outlet 11 and one inlet 10 each and thus the component 8 can also be connected to a fluid high pressure generating system. Thus, the filling with pressure fluid and pressure relief can be especially fast.

The device 1 can include a pressure reservoir, which is intercalated with respect to fluid flow between the fluid high pressure generating system and the inlet 10 of the axial borehole 9. The pressure reservoir balances the pressure fluctuations of the fluid high pressure generating system so that the degree of expansion can be set with high precision.

In addition, the reliability of the process can be further improved since there are no longer any pressure peaks that damage the hollow shaft. Furthermore, the pressure reservoir in the said embodiment with two inlets—one in each component 7, 8—can be connected to both inlets. In this manner there is uniform pressure in the expanding lance 6 without the expense of synchronization.

In the embodiment depicted in the drawing, the axial borehole 9 empties into the faces 14, 15 of the components 7, 8 that face each other. The faces 14, 15 can lie side-by-side, as in the case of joining the narrower cam 3, or also be spaced apart, as in the case of joining the thicker cam 4. The distance depends in essence on the axial reach of the necessary expansion. When the faces 14, 15 lie side-by-side, as in the case of the hollow shaft 5 being expanded at the location of the narrower cam 3, the exact positioning of the expanding lance 6 at the expansion point of the hollow shaft is relatively simple owing to the complementary stop, which belongs to the components 7, 8 and is formed by the faces 14, 15. Somewhat more complicated is the positioning of the individual components 7, 8 when the spacing between the faces is greater during the joining operation of the cam 4, since each component 7, 8 has to be assigned a positioning device, such as, for example, a position measuring sensor.

In each case the faces 14, 15 form together a cross channel 16 for the axial borehole 9, which empties freely into these two components 7, 8 on the faces 14, 15. The cross channel 16 leads in the direction of the expanding location into the annular expansion space 12, which is formed by the radial distance of the expanding lance from the inside wall 17 of the hollow shaft 5 and where said cross channel exhibits an outlet 18. Set back axially from the faces 14, 15, the components 7, 8 of the expanding lance 6 exhibit on the shell surface 22 collar-like support shoulders 19, 20, against which rests a sealing element, which is formed preferably by an elastic ring seal 21, on the side, facing the cross channel. The ring seals 21 define axially on both sides the expansion space 12 and seal it and thus also the outlet 18 of the cross channel 16 against the high pressure. The support shoulders 19, 20 are located in the hollow shaft 5 with almost no gap in the direction of the inside wall 17 in order to avoid an extrusion of the ring seals 21 and thus irreparable damage due to stress from the high internal pressure.

Within a short distance from the expanding location, the device 1 exhibits supports 23, 24, by means of which the two components 7, 8 are held immoveably in the radial direction. Thus, the components 7, 8 cannot buckle. The support 23 is arranged on component 8 outside the hollow shaft 5 and is formed by a steady rest, which reaches around the component 8 on the peripheral side. The component 7 bears a slid-on guide sleeve, which forms the support 24 and is arranged inside the hollow shaft 5. This guide sleeve rests on the outside against the inside wall 17 of the hollow shaft 5 and experiences by means of the same the necessary support force.

For the purpose of joining the fitting parts, the device 1 works as follows. First, the cams 3 and 4 are slid with their passage opening 2 onto the hollow shaft 5 to the desired position. Then the components 7 and 8 are slid into the respective hollow shaft end 25, 26 and placed in such a manner at the site of the slid-on cams 3, 4 that the faces 14, 15 come to rest in such a manner relative to each other that the expansion space 12 extends exactly over the length of the passage opening 2 of the cams 3 and 4. The axial distance between both faces 14, 15 is relatively short with respect to the cam 3 and very wide with respect to the cam 4.

For the purpose of sliding in the components 7, 8, the device 1 exhibits for each component 7, 8 a drive unit 27, which is formed by a hydraulic cylinder. The hydraulic cylinder exhibits a receptacle 28 for one end 29 of one of the components 7, 8 of the expanding lance 6. By means of the hydraulic cylinder, the two components 7, 8 are driven into the hollow profile end 25, 26, facing the same. The hydraulic cylinders remain in their extended position after the components 7, 8 have reached their expansion position. The expansion space 12 is now filled with pressure fluid over the axial borehole 9 and the cross channel 16 of the expanding lance 6. Thereafter, the check valve 13 is closed.

At this point the fluid high pressure generating system generates a fluid high pressure, whereby the hollow shaft 5 expands plastically at this point of the expansion space 12 due to being subjected to the pressure fluid. At the same time the cam 3 expands elastically over the expansion of the hollow shaft 5. During the expansion phase the components 7, 8 are supported on one end by means of the hydraulic cylinder. In generating the fluid high pressure, the ring seals 21 are pressed against the support shoulders and spread apart radially. In this manner a very high contact force against the inside wall 17 of the hollow shaft 5 is attained that guarantees a high pressure-tight seal.

Following expansion, the check valve 13 and thereby the outlet 11 are opened and the pressure fluid is thus relieved. Owing to the relief, the cam 3 on its wall defining the passage opening 2 springs back in the direction of the hollow shaft 5, which remains in its expanded position due to the plasticizing. In this manner a very strong press-fit joint is produced. The two components 7, 8 are now moved to the location of the second expansion, thus to the location of the cam 4, in the same manner as described for the cam 3, by means of the hydraulic cylinder. Thereafter the cam 4 can be joined.

What is claimed is:

1. A device for joining fitting parts, provided with a passage opening, on a hollow profile through partial expansion of the hollow profile at the location of the fitting parts, slid on with the passage opening, by means of fluid high internal pressure, said device comprising an expanding lance, which can be slid into the hollow profile and exhibits an axial borehole for the purpose of guiding the pressure fluid, said axial borehole being connected, first of all, to a fluid high pressure generating system and secondly exhibiting a cross channel with an outlet for the pressure fluid in a direction of the hollow profile location to be expanded, whereby a shell surface of the expanding lance exhibits sealing elements that are spaced apart and that define an outlet so as to seal axially on both sides against high pressure, wherein the expanding lance comprises two separate, aligned components, of which at least one bears the axial borehole, which axial borehole empties freely on an end face near an outlet of said at least one component, end faces of the components that face each other forming a cross channel for the axial borehole of the expanding lance, and wherein the device includes a drive unit, operable to drive the two components into a respective hollow profile end, facing the respective component, and wherein the two components are supported on respective end sides by the drive unit during an expansion phase.

2. The device as claimed in claim 1, wherein the drive unit is a hydraulic cylinder.

3. The device as claimed in claim 2, wherein the axial borehole extends in both components, whereby the axial borehole of each component exhibits in an outward direction one of an inlet and an outlet that is disposed outside the hollow profile when both components are slid into the hollow profile.

4. The device as claimed in claim 3, wherein the outlet is connected to a check valve which closes said outlet when the hollow profile is subjected to the high internal pressure and opens the same after the expansion phase.

5. The device as claimed in claim 1, wherein the axial borehole extends in both components, whereby the axial borehole of each component exhibits in an outward direction one of an inlet and an outlet that is disposed outside the hollow profile when both components are slid into the hollow profile.

6. The device as claimed in claim 5, wherein the outlet is connected to a check valve which closes said outlet when the hollow profile is subjected to the high internal pressure and opens the same after the expansion phase.

7. The device as claimed in claim 1, wherein the device includes a pressure reservoir which is connected, on the one hand, to the fluid high pressure generating system and, on the other hand, to fluid flow to the axial borehole.

8. The device as claimed in claim 1, wherein the device includes supports, by means of which the two components are held immoveably in a radial direction.

9. The device as claimed in claim 1, wherein the aligned components of the lance are oblong components.

10. The device as claimed in claim 1, wherein the fitting parts are cams and the hollow profile is a hollow camshaft.

11. An apparatus for connecting at least one hollow part to a hollow profile shaft, comprising:

a lance assembly insertable into the hollow profile shaft and including an axial borehole operable to communicate high pressure fluid to a section of the hollow profile shaft to plastically expand the hollow profile shaft to form a press fit with a hollow part surrounding the hollow profile shaft, and seal devices on the lance assembly operable to seal off an annular space which in use forms a high pressure space for expanding the hollow profile shaft, wherein the lance assembly includes two separate aligned lance components, said axial borehole extending in at least one of the lance components, said two lance components being spaced from one another to form a radial cross-flow passage from the axial borehole to the high pressure space intermediate facing ends of the lance components.

12. The apparatus according to claim 11, wherein said seal devices include respective ring seals on each of said lance components.

13. The apparatus according to claim 12, comprising lance drive units operable to selectively move the lance components to a plurality of positions along a length of the hollow profile shaft to thereby accommodate sequential connection of plural hollow parts at different axial positions on the hollow profile shaft.

14. The apparatus according to claim 11, comprising lance drive units operable to selectively move the lance components to a plurality of positions along a length of the hollow profile shaft to thereby accommodate sequential connection of plural hollow parts at different axial positions on the hollow profile shaft.

15. The apparatus according to claim 14, wherein said hollow profile shaft is a combustion engine camshaft and each of said at least one hollow parts is a cam.

16. The apparatus according to claim 11, wherein said hollow profile shaft is a combustion engine camshaft and each of said at least one hollow parts is a cam.

17. The apparatus according to claim 11, wherein portions of said axial borehole are disposed in both of the lance components.

* * * * *